(No Model.)
G. W. BURRIER.
HORSE RAKE.
No. 264,135. Patented Sept. 12, 1882.
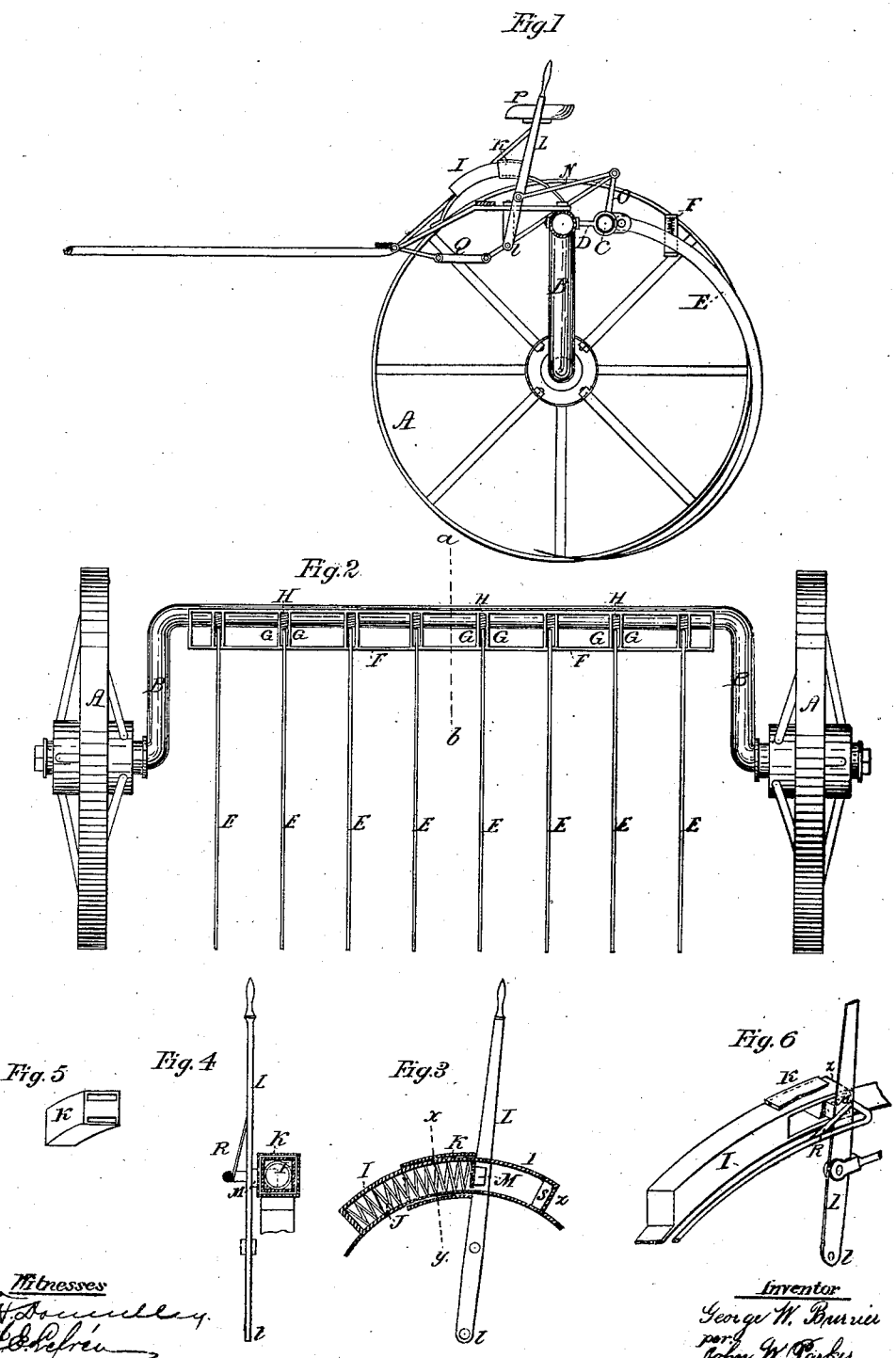

UNITED STATES PATENT OFFICE.

GEORGE W. BURRIER, OF LYON COUNTY, NEVADA.

HORSE-RAKE.

SPECIFICATION forming part of Letters Patent No. 264,135, dated September 12, 1882.

Application filed February 14, 1882. (No model.)

*To all whom it may concern:*

Be it known that I, GEORGE W. BURRIER, of Lyon county, State of Nevada, have invented a new and useful Improvement in Horse-Rakes, of which the following is a specification.

My invention relates to the class of sulky horse-rakes; and it consists in certain details of construction hereinafter more specifically shown and described. Its object is to construct a rake of increased capacity without increasing the size; also, one that will possess the greatest amount of strength in proportion to the material employed, and one that will readily adapt itself to obstructions and irregularities of the surface.

In the drawings, Figure 1 is a vertical cross-section. Fig. 2 is a rear elevation. Figs. 3, 4, 5, and 6 are detail views.

Similar letters indicate like parts.

A A represent the wheels, which I construct entirely of iron.

B is the axle, which is also of iron, and may be made hollow in order to diminish its weight, except the ends, which form the bearings for the wheels. That portion between the wheels is bent upward, as shown in Fig. 2, in order to increase the distance between the ground and the axle, thereby increasing the holding capacity of the rake.

Corresponding in length with the upper or horizontal part of the axle is the rake-head C, consisting of a hollow rod or gas-pipe, situated immediately in rear of the axle, and loosely secured to it by means of the eyebolts D, whereby it is capable of a rotary or rocking motion.

E E represent the rake-teeth hinged to the head C, and which are bent in a semicircular form and constructed of uniform thickness in order to be of equal strength throughout.

F represents a rectangular iron frame, situated slightly to the rear of the head C, and firmly connected with it, having vertically-arranged rectangular openings for the teeth formed by the partitions or cross-pieces G G. Situated within these openings, and bearing upon the upper side of the teeth, are small spiral springs H H.

O represents a short standard, projecting from the upper side of head C, which standard is connected with a hand-lever, L, by a link, N. Q represents a shoe, one end of which is pivoted to the pole or shaft of the rake, and its opposite end connected to the top of standard O by a rod.

I represents a spring-box, inclosing a spiral spring designed to press against lever L and hold it in its normal position, or that which it occupies when the teeth of the rake are upon the ground. It is shown more in detail in Figs. 3, 4, and 6. It is in shape the arc of a circle, and is situated alongside the hand-lever L, near the driver's seat. A sliding cap, K, is fitted over one end, and confines the spring within the box. The spring is compressed by means of a lug, M, upon lever L, which bears against the end of box K and forces the spring back when the lever is moved forward.

The operation of my rake is as follows: The teeth E gather the hay, and, owing to their length and peculiar form of the axle, are enabled to retain a larger quantity than rakes of ordinary construction. When a slight obstruction or irregularity in the surface is encountered the teeth are forced upward, and the springs H yield sufficiently to enable the teeth to clear the obstruction; or, if the obstruction is a larger one, requiring the teeth to rise to a greater height to clear it, the lever is forced forward by means of the standard O and link N and compresses the spring in box I until the obstruction is passed, when the pressure of the spring instantly forces the lever and rake-head to their normal position. When the rake is full and it is desired to empty it the operator moves the lever L sidewise sufficiently to disengage the lug M from its position against the end of slide K, and presses downward with his foot upon the shoe Q, thereby raising frame F and lifting the teeth to a sufficient height to release the hay. The pressure is then withdrawn and the lever forced back to its position, and the rake is prepared to gather another load.

Having thus described my invention, what I claim, and desire to secure by Letters Patent, is—

1. The combination of the spring-box I, having the spring and the movable cap K, with the lever L, provided with the lug M, the link N, standard O, head C, having the teeth hinged thereto, and the frame F, substantially as and for the purposes set forth.

2. The combination of the bent axle, the head C, having the teeth hinged thereto, the frame F, having the rectangular slots provided with springs H, the standard O, link N, lever L, shoe Q, and its link connecting it with the top of standard O, all arranged and operating substantially as and for the purpose set forth.

GEORGE WASHINGTON BURRIER.

Witnesses:
JOHN W. PARKER,
N. KIMBALL.